US012451052B2

(12) United States Patent
Yang

(10) Patent No.: US 12,451,052 B2
(45) Date of Patent: Oct. 21, 2025

(54) DRIVING METHOD FOR DISPLAY PANEL, PIXEL DRIVING CIRCUIT, AND DISPLAY PANEL

(71) Applicants: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

(72) Inventor: Mengxia Yang, Guangdong (CN)

(73) Assignees: HUIZHOU CHINA STAR OPTOELECTRONICS DISPLAY CO., LTD., Guangdong (CN); TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/553,268

(22) PCT Filed: Jul. 19, 2023

(86) PCT No.: PCT/CN2023/108066
§ 371 (c)(1),
(2) Date: Sep. 29, 2023

(87) PCT Pub. No.: WO2025/000605
PCT Pub. Date: Jan. 2, 2025

(65) Prior Publication Data

US 2025/0078729 A1 Mar. 6, 2025

(30) Foreign Application Priority Data

Jun. 27, 2023 (CN) ......................... 202310773297.4

(51) Int. Cl.
*G09G 3/32* (2016.01)

(52) U.S. Cl.
CPC ....... *G09G 3/32* (2013.01); *G09G 2300/0842* (2013.01); *G09G 2310/027* (2013.01); *G09G 2320/0626* (2013.01)

(58) Field of Classification Search
CPC ............. G09G 3/32; G09G 2300/0842; G09G 2310/027; G09G 2320/0626
See application file for complete search history.

(56) References Cited

U.S. PATENT DOCUMENTS 5,559,529 A * 9/1996 Maher .................... G09G 5/393 345/613
7,215,347 B2 * 5/2007 Phan ........................ H04N 9/30 345/694

(Continued)

FOREIGN PATENT DOCUMENTS

CN 108230926 A 6/2018
CN 108564890 A 9/2018

(Continued)

OTHER PUBLICATIONS

International Search Report in International application No. PCT/CN2023/108066, mailed on Mar. 26, 2024.

(Continued)

*Primary Examiner* — Christopher E Leiby
(74) *Attorney, Agent, or Firm* — PV IP PC; Wei Te Chung

(57) ABSTRACT

A driving method for a display panel, a pixel driving circuit, and a display panel are provided. An image to be displayed is divided into multiple consecutive display stages, a first control signal is provided for 1st to (N−1)-th subframes, a second control signal is provided for the N-th subframe, and different pixel data structures are obtained for different display stages. A first control signal is a pulse width modulation (PWM) signal, and a second control signal is a pulse (Continued)

amplitude modulation (PAM) signal. Accordingly, the display performance is effectively enhanced.

14 Claims, 6 Drawing Sheets

(56) References Cited

U.S. PATENT DOCUMENTS

| | | | | |
|---|---|---|---|---|
| 7,898,623 | B2 * | 3/2011 | Kimura | G09G 3/3241 349/108 |
| 8,130,175 | B1 * | 3/2012 | Joffer | G09G 3/32 345/44 |
| 8,619,008 | B2 * | 12/2013 | Cok | H10K 59/129 345/83 |
| 2004/0164936 | A1 * | 8/2004 | Lim | G06F 3/1446 345/76 |
| 2007/0262732 | A1 * | 11/2007 | Shen | H05B 45/327 315/312 |
| 2010/0225252 | A1 * | 9/2010 | Weaver | H10K 59/351 257/E51.026 |
| 2014/0267462 | A1 * | 9/2014 | Sato | G02F 1/133 345/89 |
| 2015/0179096 | A1 * | 6/2015 | Derckx | G09G 3/348 345/212 |
| 2016/0300519 | A1 * | 10/2016 | Shi | G09G 3/2003 |
| 2019/0140030 | A1 * | 5/2019 | Huangfu | H10K 59/122 |
| 2019/0251893 | A1 * | 8/2019 | Martin | G09G 3/32 |
| 2019/0371232 | A1 * | 12/2019 | Kim | G09G 3/2014 |
| 2021/0027700 | A1 * | 1/2021 | Chun | G09F 9/301 |
| 2021/0065625 | A1 * | 3/2021 | Wang | G09G 3/3233 |
| 2022/0335894 | A1 | 10/2022 | Zhou et al. | |
| 2023/0326400 | A1 * | 10/2023 | Kim | G09G 3/2081 |
| 2024/0038128 | A1 * | 2/2024 | Liu | G09G 3/2022 |
| 2024/0257755 | A1 * | 8/2024 | Yuan | G09G 3/3225 |
| 2024/0331616 | A1 * | 10/2024 | Lim | G09G 3/3233 |

FOREIGN PATENT DOCUMENTS

| | | |
|---|---|---|
| CN | 111477165 A | 7/2020 |
| CN | 114373420 A | 4/2022 |
| CN | 117456884 A | 1/2024 |

OTHER PUBLICATIONS

Written Opinion of the International Search Authority in International application No. PCT/CN2023/108066, mailed on Mar. 26, 2024.

* cited by examiner

DRIVING METHOD FOR DISPLAY PANEL, PIXEL DRIVING CIRCUIT, AND DISPLAY PANEL

TECHNICAL FIELD

The present invention relates to a field of display panel driving technology, and in particular, to a driving method for a display panel, a pixel driving circuit, and a display panel.

DESCRIPTION OF RELATED ART

With the development of display panel manufacturing technology, there have been higher demands for the display quality and overall performance of display panels and display devices.

Currently, the transparency of light-emitting diode (LED) transparent screens decreases gradually at high pixel densities, and the design complexity increases progressively. In order to enhance their performance, LED transparent screens in the market typically involve improvements in surface mount manufacturing processes, LED chip packaging, control systems, etc. of conventional light bar screens on printed circuit boards (PCB), or incorporating structural designs such as hollowing out to improve screen transparency. However, as pixel densities continue to increase, conventional manufacturing processes and driving methods are no longer able to meet the demands, hindering further improvement in display panel performance.

Therefore, it is necessary to propose solutions to address the existing issues in current technology.

SUMMARY OF INVENTION

In summary, in current technology, conventional manufacturing processes and their corresponding driving methods cannot meet the performance requirements of display panels that need both high pixel density and good transparency. This limitation hinders further improvements in the overall performance of display panel.

To address the aforementioned issues, embodiments of the present invention provide a driving method for a display panel, a pixel driving circuit, and a display panel. These aim to effectively improve the problem of unsatisfactory display performance when driving display panels with high pixel densities in conventional technology.

In order to solve the above technical problems, the present application provides a driving method for a display panel, including following steps:

- obtaining a frame of an image to be displayed;
- in each frame of the image to be displayed, dividing the image to be displayed into multiple consecutive display stages, each of the display stages including N subframes, wherein N is an integer greater than or equal to 1;
- in each of the display stages, providing a first control signal to pixel units in the 1st subframe to the (N−1)-th subframe among the N subframes through pixel driving circuits of the display panel; and
- providing a second control signal to the pixel units in the N-th subframe among the N subframes and obtaining different pixel data structures in the respective display stages for display, wherein the pixel data structures in the display stages are displayed by respectively corresponding pixel arrays consisting of different numbers of rows and columns.

According to one embodiment of the present application, among the N subframes, the pixel units display low grayscale values in the 1st subframe to the (N−1)-th subframe, and the pixel units display high grayscale values in the N-th subframe;

- wherein the first control signal is a pulse width modulation (PWM) signal, and the second control signal is a pulse amplitude modulation (PAM) signal.

According to one embodiment of the present application, the pixel units are arranged in an array within a display area of the display panel and form an N*M pixel array, and each of the pixel units includes a first color sub-pixel, a second color sub-pixel, and a third color sub-pixel;

- wherein, in each of the pixel units, one of the sub-pixels among the first color sub-pixel, the second color sub-pixel, or the third color sub-pixel is duplicated twice.

According to one embodiment of the present application, in the pixel array, during the process of controlling the pixel units for each frame through the pixel driving circuits, the sub-pixels duplicated twice in each pixel unit are individually controlled separately in both odd-numbered rows and even-numbered rows.

According to one embodiment of the present application, each frame of the image includes a first stage, a second stage, a third stage, and a fourth stage consecutively set, each stage consisting of 8 subframes, and during driving, the 1st to 7th subframes are pulse width modulated (PWM), and the 8th subframe is pulse amplitude modulated (PAM).

According to one embodiment of the present application, the display stages include:

- in the first stage, controlling the pixel driving circuit to set data signal values of the first color sub-pixels in odd-numbered rows within the pixel array to zero, wherein the first control signal is provided in the 1st subframe to the 7th subframe, while the second control signal is provided in the 8th subframe, resulting in a first pixel data structure;
- in the second stage, controlling the pixel driving circuit to set data signal values of the first color sub-pixels in even-numbered rows within the pixel array to zero, with data signal values of the sub-pixels in a first column and a last column set to zero, wherein the first control signal is provided in the 1st subframe to the 7th subframe, and the second control signal is provided in the 8th subframe, resulting in a second pixel data structure;
- in the third stage, controlling the pixel driving circuit to set the data signal values of the first color sub-pixels in the odd-numbered rows within the pixel array to zero, along with setting data signal values of the sub-pixels in a first row and a last row to zero, wherein the first control signal is provided in the 1st subframe to the 7th subframe, and the second control signal is provided in the 8th subframe, resulting in a third pixel data structure; and
- in the fourth stage, controlling the pixel driving circuit to set the data signal values of the first color sub-pixels in the even-numbered rows to zero, as well as setting data signal values of the sub-pixels in the first row, the last row, the first column, and the last column to zero, wherein the first control signal is provided in the 1st subframe to the 7th subframe, and the second control signal is provided in the 8th subframe, resulting in the fourth pixel data structure.

According to one embodiment of the present application, in different pixel data structures, each pixel unit includes a virtual pixel, and the virtual pixel is located at a center of the pixel unit.

In a second aspect, the present application provides a driving method for a display panel, including following steps:

- obtaining a frame of an image to be displayed;
- in each frame of the image to be displayed, dividing the image to be displayed into multiple consecutive display stages, each of the display stages including N subframes, wherein N is an integer greater than or equal to 1;
- in each of the display stages, providing a first control signal to pixel units in the 1st subframe to the (N−1)-th subframe among the N subframes through pixel driving circuits of the display panel; and
- providing a second control signal to the pixel units in the N-th subframe among the N subframes and obtaining different pixel data structures in the respective display stages for display.

According to one embodiment of the present application, among the N subframes, the pixel units display low grayscale values in the 1-st subframe to the (N−1)-th subframe, and the pixel units display high grayscale values in the N-th subframe;

- wherein the first control signal is a pulse width modulation (PWM) signal, and the second control signal is a pulse amplitude modulation (PAM) signal.

According to one embodiment of the present application, the pixel units are arranged in an array within a display area of the display panel and form an N*M pixel array, and each of the pixel units includes a first color sub-pixel, a second color sub-pixel, and a third color sub-pixel;

- wherein, in each of the pixel units, one of the sub-pixels among the first color sub-pixel, the second color sub-pixel, or the third color sub-pixel is duplicated twice.

According to one embodiment of the present application, in the pixel array, during the process of controlling the pixel units for each frame through the pixel driving circuits, the sub-pixels duplicated twice in each pixel unit are individually controlled separately in both odd-numbered rows and even-numbered rows.

According to one embodiment of the present application, each frame of the image includes a first stage, a second stage, a third stage, and a fourth stage consecutively set, each stage consisting of 8 subframes, and during driving, the 1st to 7th subframes are pulse width modulated (PWM), and the 8-th subframe is pulse amplitude modulated (PAM).

According to one embodiment of the present application, the display stages include:

- in the first stage, controlling the pixel driving circuit to set data signal values of the first color sub-pixels in odd-numbered rows within the pixel array to zero, wherein the first control signal is provided for the 1st subframe to the 7th subframe, while the second control signal is provided for the 8th subframe, resulting in a first pixel data structure;
- in the second stage, controlling the pixel driving circuit to set data signal values of the first color sub-pixels in even-numbered rows within the pixel array to zero, along with setting data signal values of the sub-pixels in a first column and a last column to zero, wherein the first control signal is provided for the 1st subframe to the 7th subframe, and the second control signal is provided for the 8th subframe, resulting in a second pixel data structure;
- in the third stage, controlling the pixel driving circuit to set the data signal values of the first color sub-pixels in the odd-numbered rows within the pixel array to zero, along with setting data signal values of the sub-pixels in a first row and a last row to zero, wherein the first control signal is provided for the 1st subframe to the 7th subframe, and the second control signal is provided for the 8th subframe, resulting in a third pixel data structure; and
- in the fourth stage, controlling the pixel driving circuit to set the data signal values of the first color sub-pixels in the even-numbered rows to zero, as well as setting data signal values of the sub-pixels in the first row, the last row, the first column, and the last column to zero, wherein the first control signal is provided for the 1st subframe to the 7th subframe, and the second control signal is provided for the 8th subframe, resulting in the fourth pixel data structure.

According to one embodiment of the present application, in different pixel data structures, each pixel unit includes a virtual pixel, and the virtual pixel is located at a center of the pixel unit.

In a third aspect, the present application further provides a pixel driving circuit, including:

- a first thin-film transistor, wherein a gate of the first thin-film transistor is connected to a first scan signal line, and a source of the first thin-film transistor is connected to a data voltage line;
- a second thin-film transistor, wherein a gate of the second thin-film transistor is connected to a drain of the first thin-film transistor, a drain of the second thin-film transistor is connected to a high potential voltage power supply, and a source of the second thin-film transistor is connected to a light-emitting diode and one end of a first capacitor;
- a third thin-film transistor, wherein a gate of the third thin-film transistor is connected to a third scan signal line, a source of the third thin-film transistor is connected to the source of the second thin-film transistor, and a drain of the third thin-film transistor is connected to a reference voltage; and
- a fourth thin-film transistor, wherein a gate of the fourth thin-film transistor is connected to the second scan signal line, a source of the fourth thin-film transistor is connected to the drain of the first thin-film transistor and another end of the first capacitor, and a drain of the fourth thin-film transistor is connected to an initial voltage.

According to one embodiment of the present application, at low grayscale values, the first scan signal line and the third scan signal line are set to a high level, turning on the first thin-film transistor and the third thin-film transistor, and the data voltage is supplied to the second thin-film transistor, turning on the second thin-film transistor, and subsequently, the first scan signal line and the third scan signal line transition are set to a low level, turning off the first thin-film transistor and the third thin-film transistor;

- at high grayscale values, the second scan signal line is set to a low level, turning off the fourth thin-film transistor, and amplitudes of the data voltage are adjusted, allowing the pixel unit to display different grayscale values.

According to one embodiment of the present application, pulse width modulation signals are provided at the low grayscale values, pulse amplitude modulation signals are provided at the high grayscale values, and under the drive of the pulse width modulation signals, a duty cycle corresponding to a charging time of each subframe is controlled to obtain different grayscale values.

Advantageous Effects

In summary, the advantageous effects of the embodiments of the present invention are as follows. Compared to conventional techniques, the embodiments of this application provide a driving method for a display panel, a pixel driving circuit, and a display panel. In the driving process, each frame of an image is divided into multiple consecutive display stages. Each display stage includes N subframes. The pixel driving circuit of the display panel provides a first control signal to pixel units in the 1st subframe to the (N−1)-th subframe among the N subframes and provides a second control signal to the pixel units in the N-th subframe among the N subframes, obtaining pixel data structures for different display stages. The first control signal is a pulse width modulation signal, and the second control signal is a pulse amplitude modulation signal. In this application, by controlling different control signals in different subframes and having different pixel data structures at different times in each subframe, due to very short time intervals between different pixel data structures, and taking advantage of the persistence effect of human visual perception, the present application effectively achieves a fourfold pixel display effect and reduces the number of the pixel units and the layout of the driving lines in the display panel, thereby improving the overall performance of the panel.

DETAILED DESCRIPTION OF EMBODIMENTS

Figure 1:
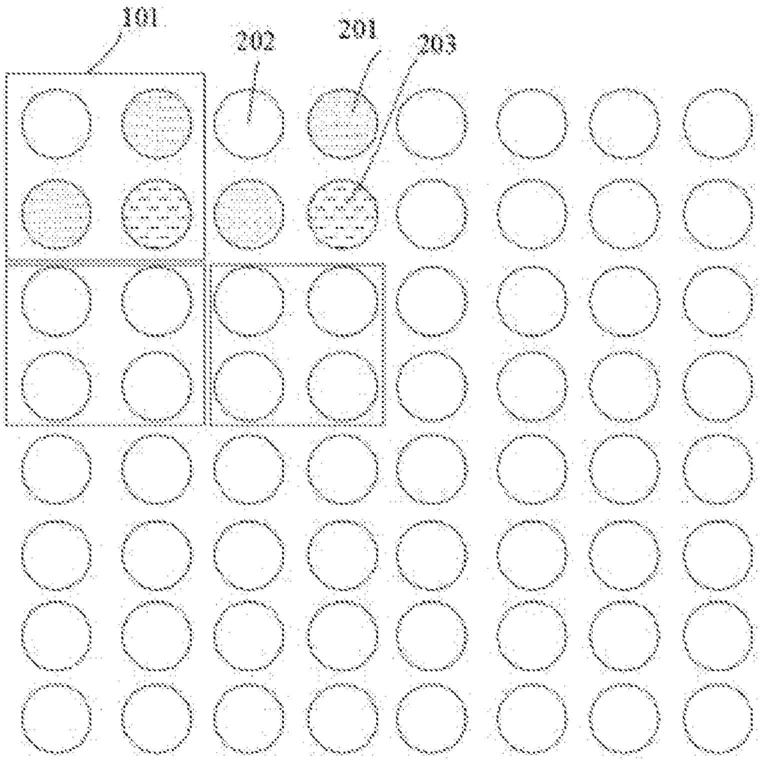
FIG. 1 is a schematic diagram illustrating an arrangement of pixel units according to one embodiment of the present application.

The following explanation of various embodiments is provided with reference to the accompanying drawings to illustrate specific implementations that can be used to carry out the present disclosure.

As manufacturing technologies for display panels and display devices continue to advance, there are increasing demands for higher performance and display quality in display devices.

In the embodiments of this application, a pixel driving method, a driving circuit, and a display panel are provided to ensure that the display panel, while satisfying high pixel density requirements, also achieves a high level of light transmission and effectively enhances the overall performance of the display panel.

When displaying images on the display panel, the term "frame" refers to one display image among a sequence of continuous display images. A display image frame is equivalent to a still image. According to the visual characteristics of the human eye, it is required to play multiple image frames per second to feel the continuity of image display; otherwise, one may perceive flickering in the display device.

In addition, one display image frame can be divided into multiple consecutive display stages as needed, with multiple display stages occurring sequentially to ultimately display one frame. Within each display stage, there can be multiple subframes, where each subframe corresponds to a subfield period. During one subfield period, pixel units maintain illumination for a specific duration, thereby displaying a brightness level/grayscale corresponding to that illumination duration. The longer the pixel units maintain illumination, the brighter the corresponding display, indicating a higher grayscale. Therefore, when the pixel units of a display device are displaying one image frame, they are actually continuously displaying multiple subframes within each display stage, accumulating the illumination duration of each subframe and, consequently, accumulating the corresponding brightness levels. This results in the formation of a corresponding display image in the human visual perception.

In the embodiments of the present application, in order to improve the performance of the display panel, when producing the display panel, a transparent substrate, such as a transparent glass substrate, is used, and light-emitting diodes and driving circuits corresponding to the multiple pixel units are arranged on the transparent glass substrate to ultimately form a light-emitting diode (LED) display panel with a transparent screen provided in the present application. Since the transparent glass substrate has good light transmittance, most of the light can directly pass through areas not blocked by LEDs and circuits. Therefore, the transparent glass substrate in the embodiments of the present application can effectively improve the transparency of the display panel.

Specifically, in the embodiments of the present application, when configuring the pixel units corresponding to the LEDs in the display panel, the pixel units can be arranged in an array on the transparent glass substrate, such as forming an N*M array structure on the transparent glass substrate. N and M are both integers, and there are no specific limitations here.

As shown in FIG. 1, FIG. 1 is a schematic diagram of an arrangement of the pixel units in the display panel according to one embodiment of the present application. In the present embodiment, a pixel array consisting of 4 rows and 4 columns is used as an example for explanation.

Specifically, during arrangement, multiple pixel units 101 are arranged as an array in row and column directions, and finally form a 4*4 array structure as shown in FIG. 1. Each pixel unit 101 corresponds to one light-emitting diode. When the display panel is operating normally, display on the display panel is achieved by controlling the light-emitting diodes. Each pixel unit 101 includes multiple sub-pixels, and multiple different sub-pixels are packaged in one same light-emitting diode to form one pixel unit.

Specifically, the pixel unit 101 can include multiple sub-pixels of different colors. For example, each pixel unit 101 includes a first color sub-pixel, a second color sub-pixel, and a third color sub-pixel. These different color sub-pixels can be arranged as a rectangular structure. Optionally, each pixel unit 101 also includes other quantities of different color sub-pixels, arranged as different array structures. In the pixel unit 101, one of the sub-pixels among the first color sub-pixel, the second color sub-pixel, or the third color sub-pixel is set as two. For example, if there are two first color sub-pixels, then there is one second color sub-pixel and one third color sub-pixel. Alternatively, there may be two sub-pixels of another color, and a detailed description is omitted herein.

In the following examples, the pixel unit 101 is illustrated with two red sub-pixels 201, one blue sub-pixel 202, and one green sub-pixel 203, as an example. The two red sub-pixels 201 are diagonally positioned at the corners of the rectangle, as shown in FIG. 1. As an example, the first color sub-pixel is the red sub-pixel 201, the second color sub-pixel is the blue sub-pixel 202, and the third color sub-pixel is the green sub-pixel 203, but the specific configuration is not limited here.

Figure 2:
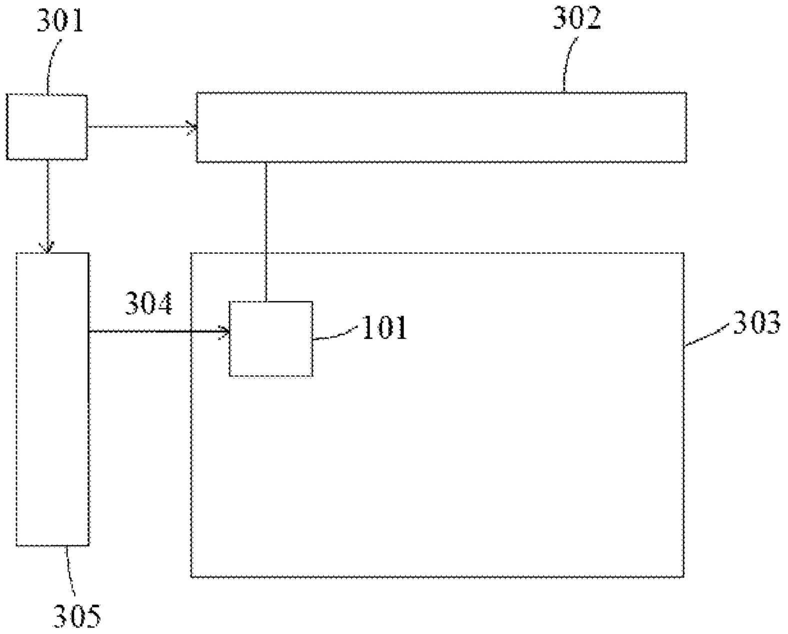
FIG. 2 is a schematic structural diagram illustrating a display device according to one embodiment of the present application.

Taking the display panel arranged with the pixel structure mentioned above as an example, the drive of this display panel is described. Specifically, as shown in FIG. 2, FIG. 2 is a schematic diagram of the structure of the display device according to one embodiment of this application. The display device includes a display panel 303, a data processing device 301, a gate driving device 305, a pixel driving device 302, and multiple pixel units 101.

Each light-emitting diode is arranged within each pixel unit 101. When the display device is functioning normally, the data processing device 301 can receive image data, such as RGB values corresponding to the image data, from an external device. The data processing device 301 then converts the RGB values corresponding to the image data into data suitable for the pixel driving device 302. Finally, the converted data is transmitted to the pixel units, causing the display panel to emit light for display. The above-mentioned various functional modules can be configured and arranged in accordance with conventional structures, and the configuration and arrangement are not elaborated here. In the embodiments of this application, the display device includes pixel driving circuits arranged corresponding to the pixel units 101 and control these pixel units during the illumination process to achieve different display effects and objectives.

In the embodiments of the present application, when driving the display, the display panel is driven using a combination of pulse width modulation (PWM) and pulse amplitude modulation (PAM) driving modes. This effectively enhances the display performance of the display panel and device.

Figure 3:
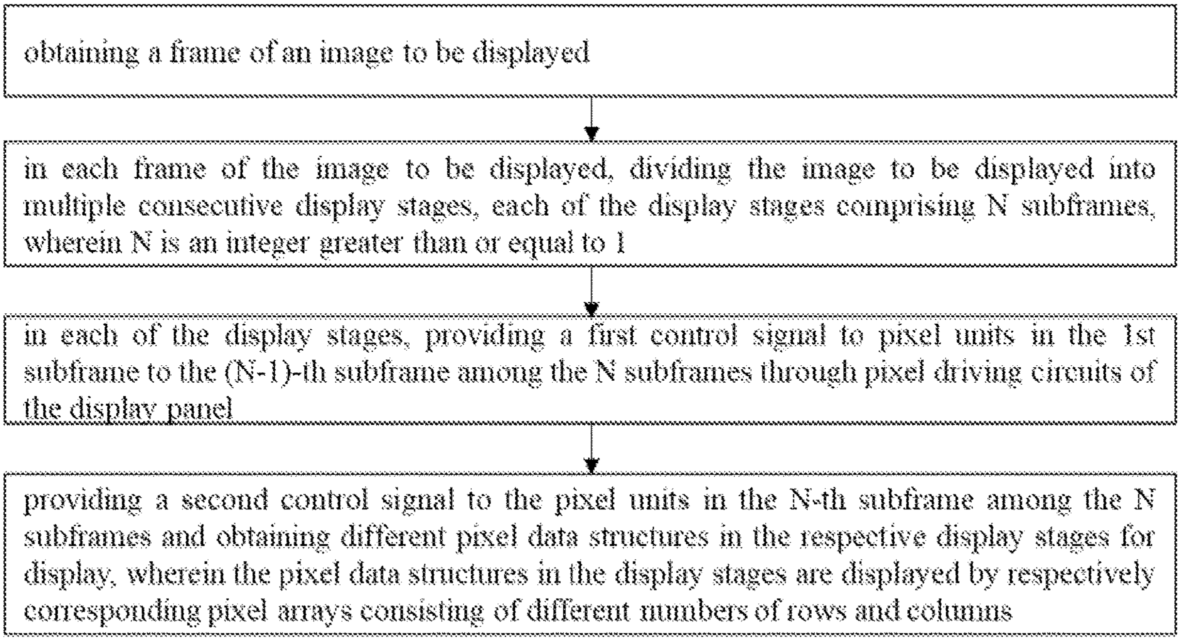
FIG. 3 is a process flow diagram illustrating a driving method according to one embodiment of the present application.

Specifically, as shown in FIG. 3, FIG. 3 is a process flow diagram illustrating a driving method according to one embodiment of the present application. The driving method for display includes following steps:

obtaining a frame of an image to be displayed;

in each frame of the image to be displayed, dividing the image to be displayed into multiple consecutive display stages, each of the display stages including N subframes, wherein N is an integer greater than or equal to 1;

in each of the display stages, providing a first control signal to pixel units in the 1st subframe to the (N−1)-th subframe among the N subframes through pixel driving circuits of the display panel; and providing a second control signal to the pixel units in the N-th subframe among the N subframes and obtaining different pixel data structures in the respective display stages for display.

In the embodiments of this application, a frame of the image to be displayed can be one of the frames from multiple frames of images to be displayed in the display device. Optionally, in the following embodiments, a frame of the image to be displayed can be a frame image that will be displayed in the next moment, or it can be each frame image from all the display images in the display device.

During operation, the actual image to be displayed exists in the form of current data or voltage data corresponding to the image to be displayed. During application, an initial display data for the next frame of the image to be displayed is input to a display driving module from an external storage device. The display driving module detects and analyzes the initial display data and generates display drive voltages corresponding to the initial display data based on reference voltages. These display drive voltages are then input into the pixel driving circuits for driving the display.

After obtaining a frame of the image to be displayed, it is divided into multiple consecutive display stages. These sequentially set display stages ultimately form a complete frame of the image. In the following embodiments, the image to be displayed is divided into four consecutive display stages. Specifically, these four display stages include the consecutively set first stage, second stage, third stage, and fourth stage.

At the same time, for each display stage, each stage includes N subframes, such as the 1st subframe, 2nd subframe, 3rd subframe, . . . the Nth subframe, with N being an integer greater than or equal to 1. In the present embodiment, each frame corresponding to the 4×4 pixel array is divided into 8 subframes, without more specific limitations in this embodiment. Additionally, at low grayscale values of the pixel unit, pulse width modulation (PWM) is used for driving, while at high grayscale values, pulse amplitude modulation (PAM) is employed for driving. During the driving process, the 1st subframe to the 7th subframe use pulse width modulation with the same amplitude values but different duty cycles, and the 8th subframe uses pulse amplitude modulation. These four different stages are executed sequentially, with 8 subframes being repeated four times, resulting in a total of 32 subframes for each frame of the image to be displayed. This improves the display performance of the display panel.

To be specific, in the driving process, within each display stage, the pixel driving circuit provides a first control signal to the pixel units in the 1st subframe to the (N−1)-th subframe among the N subframes. Then, the pixel driving circuit provides a second control signal to the pixel units in the N-th subframe among N subframes. This process results in obtaining different pixel data structures for different display stages and displaying the pixel data structures separately. Due to the extremely short intervals between the display stages and the subframes, under the visual residual effect, the display effects of different subframes are visually superimposed, resulting in the final display effect.

In the present embodiment, the preceding (N−1) subframes are all for displaying low grayscale values, while the N-th subframe is for displaying high grayscale values. Additionally, the first control signal is a pulse width modulation signal, whereas the second control signal is a pulse amplitude modulation signal.

As shown in FIGS. 4 to 9, FIGS. 4 to 9 are schematic diagrams illustrating the pixel data structures for the pixel units in each subframe according to one embodiment of the present application. When the pixel units are displayed, the red, green, and blue sub-pixels within each pixel unit can be combined four times in the up, down, left, and right directions, respectively, with their neighboring sub-pixels to create a new pixel unit. This allows for repeated combination and color mixing for display effects. During display, each independent sub-pixel within the pixel unit 101 is a real pixel point. In the center of pixel unit 101, based on the visual characteristics of the human eye, multiple frames of images need to be continuously displayed per second to perceive the continuity of image display; otherwise, flickering of the display device will be perceived. When driving the display, due to the very short time intervals between the subframes, on the order of microseconds, when the displayed information is scrolled in a certain way, taking advantage of the transient visual persistence effect of the human eye, a series of moving, physically non-existent virtual pixels appear between adjacent pixels. This effectively forms a virtual pixel 40. The emission points of the virtual pixels 40 are at the centers of different light-emitting diodes, whereas the emission points of the real pixels are within the same light-emitting diode, meaning that the points of this virtual pixels are dispersed, while the points of the real pixels are condensed. Thus, by reusing sub-pixels multiple times through the above virtual display technique, display panel resolution is enhanced, leading to optimal image quality.

Figure 4:
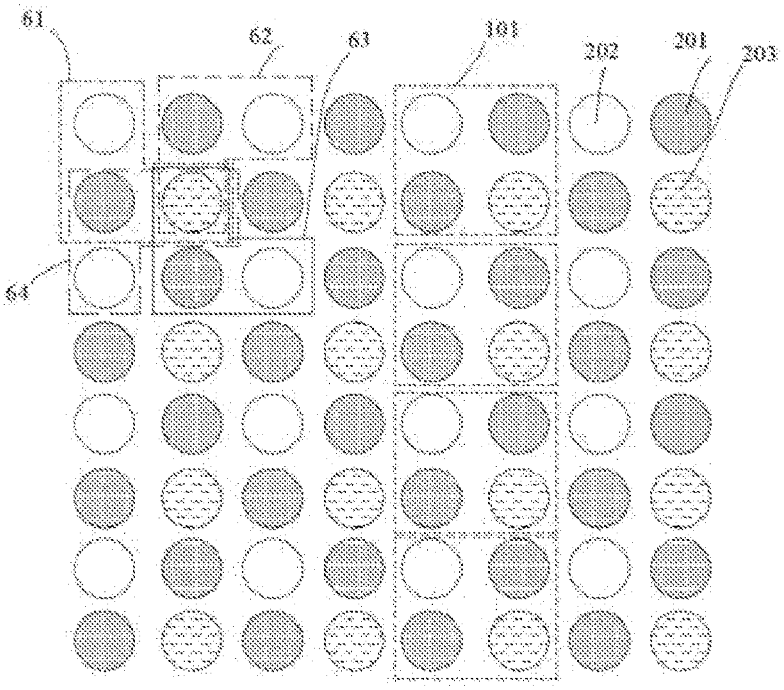
FIGS. 4 to 9 are schematic diagrams illustrating the pixel data structures of the pixel units in each subframe according to one embodiment of the present application.

Combining FIGS. 4 to 9, among the 1st subframe to the 7th subframe, in each frame, see FIG. 4 for details, at time T0, the pixel units 101 remain unlit, forming a pixel array consisting of 4 rows and 4 columns. Within this pixel array, the sub-pixels in different rows are independently controlled. For example, the red sub-pixels 201 in odd-numbered rows and even-numbered rows are controlled separately, enabling different display effects. In this example, the corresponding pixel array is a 4*4 pixel array.

Figure 5:
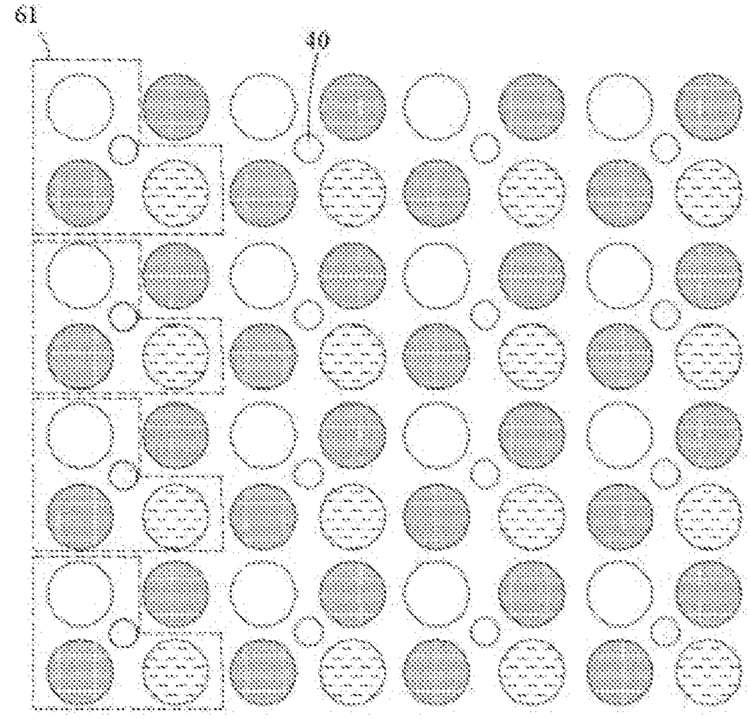

Referring to FIG. 5, in conjunction with the structure shown in FIG. 4, during the first stage (t1), driving signals are provided to the pixel units. Different effects are achieved by controlling the grayscale values of the sub-pixels of different colors. Due to the presence of the virtual pixels 40, there is a correspondence between the distribution of these virtual pixels 40 and the grayscale values of different sub-pixels.

Specifically, during the first stage (t1), the pixel driving circuits are controlled to make the corresponding sub-pixels display different effects. In detail, the data signal values of the red sub-pixels 201 in the odd-numbered rows within the pixel array, such as the 1st row, 3rd row, and so on, are set to zero. At this point, when displaying, a first pixel data structure 61 is obtained, and the first pixel data structure 61 is displayed in a 4×4 pixel array. Simultaneously, during this first stage (t1), among the 1st to 8th subframes, the first control signal is provided in the 1st subframe to the 7th subframe, and the first control signal is a PWM control signal, while the second control signal is provided in the 8th subframe, and the second control signal is the PAM control signal, resulting in the first pixel data structure 61.

Figure 6:
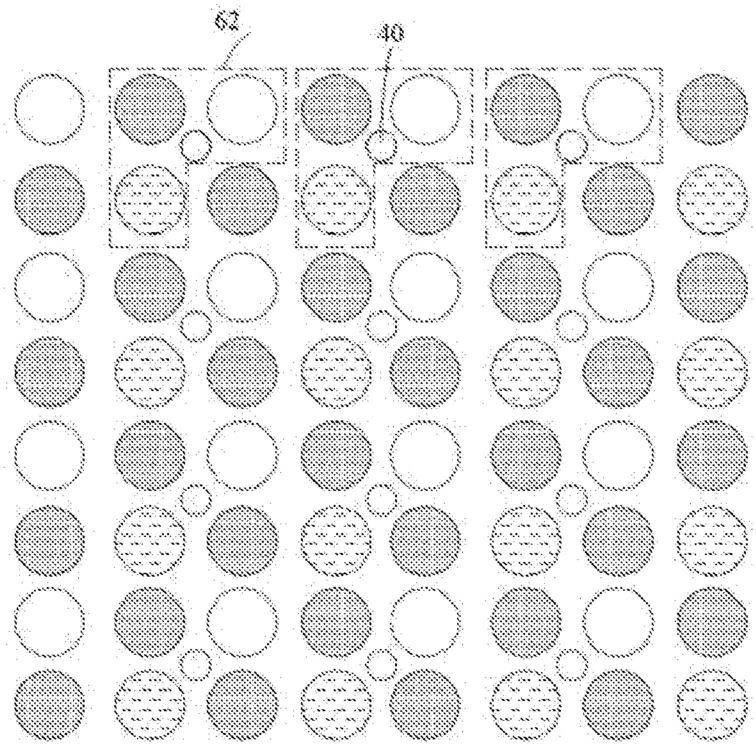

Referring to FIG. 6, during the second stage (t2), when driving signals are provided to the pixel units, similarly, different display effects are achieved by controlling the grayscale values of different color sub-pixels. Specifically, during this second stage (t2), the data signal values of the red sub-pixels 201 in the even-numbered rows within the pixel array are set to zero. Simultaneously, the data signal values of the sub-pixels in the first column and the last column are also set to zero. Under these control conditions, the second pixel data structure 62 is obtained. At this point, the second pixel data structure 62 is displayed in a 4×3 pixel array. Additionally, during this second stage (t2), among the 1st to 8th subframes, the first control signal is provided in the 1st subframe to the 7th subframe, and the first control signal is the PWM control signal, while the second control signal is provided in the 8th subframe, and the second control signal is the PAM control signal, resulting in the second pixel data structure 62. In the present embodiment, under the second pixel data structure 62, apart from the set-to-zero sub-pixels, the control signals for the remaining sub-pixels are the same as those in the first stage.

In the present embodiment, when controlling the sub-pixels in the pixel array, the sub-pixels duplicated twice in each pixel unit are individually controlled separately in the odd-numbered rows and even-numbered rows. For example, the red sub-pixels 201 in each pixel unit are controlled individually. Further details on other cases are not provided here.

Figure 7:
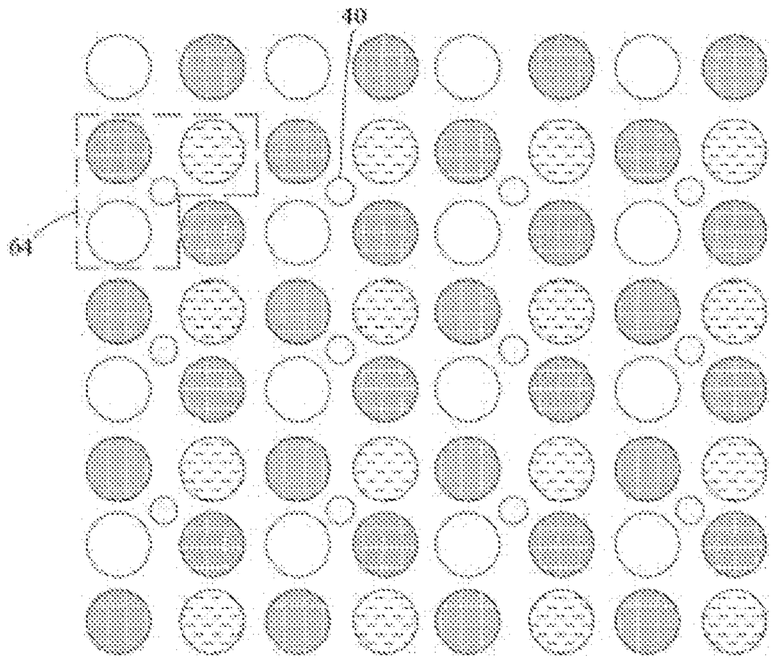

Referring to FIG. 7, during the third stage (t3), when driving signals are provided to the pixel units, the data signal values of the red sub-pixels 201 in the odd-numbered rows within the pixel array are set to zero. Simultaneously, the data signal values of the sub-pixels in the first row and the last row are also set to zero. Under these control conditions, the third pixel data structure 64 is obtained. At this point, the third pixel data structure 64 is displayed in a 3×4 pixel array. Additionally, during the third stage (t3), among the 1st to 8th subframes, the first control signal is provided in the 1st subframe to the 7th subframe, and the first control signal is the PWM control signal, while the second control signal is provided in the 8th subframe, and the second control signal is the PAM control signal, resulting in the third pixel data structure 64. Similarly, under this third pixel data structure 64, apart from the set-to-zero sub-pixels, the control signals for the remaining sub-pixels are the same as those in the first stage.

Figure 8:
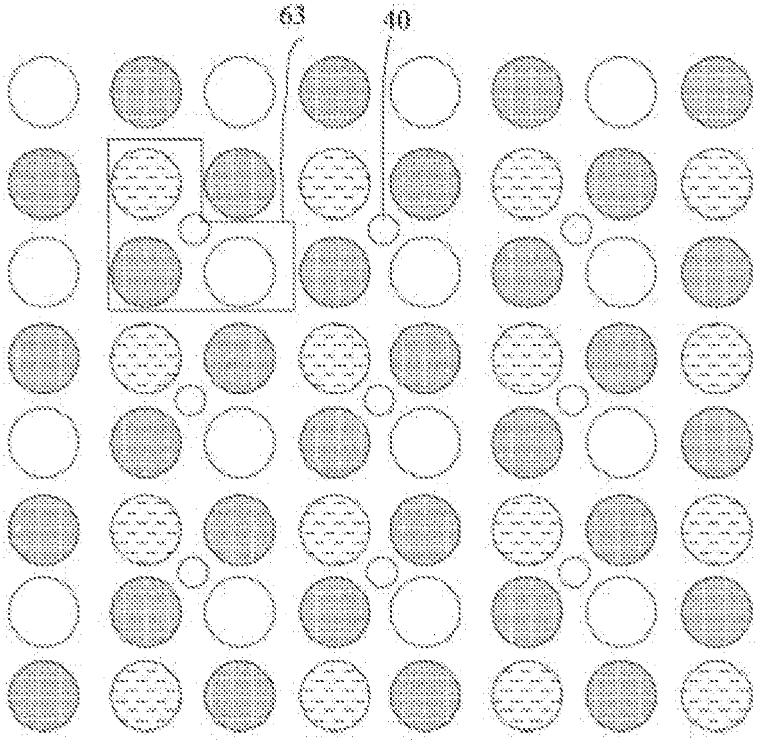

Referring to FIG. 8, during the fourth stage (t4), when controlling the pixel driving circuit, the data signal values of the red sub-pixels 201 in the even-numbered rows within the pixel array are set to zero. Simultaneously, the data signal values of the sub-pixels in the first row, last row, first column, and last column are also set to zero. Under these control conditions, the fourth pixel data structure 63 is obtained. At this point, the fourth pixel data structure 63 is displayed in a 3×3 pixel array. Additionally, during this fourth stage (t4), among the 1st to 8th subframes, the first control signal is provided in the 1st subframe to the 7th subframe, and the first control signal is the PWM control signal, while the second control signal is provided in the 8th subframe, and the second control signal is the PAM control signal, resulting in the fourth pixel data structure 63. Similarly, under this fourth pixel data structure 63, apart from the set-to-zero sub-pixels, the control signals for the remaining sub-pixels are the same as those in the first stage.

Figure 9:
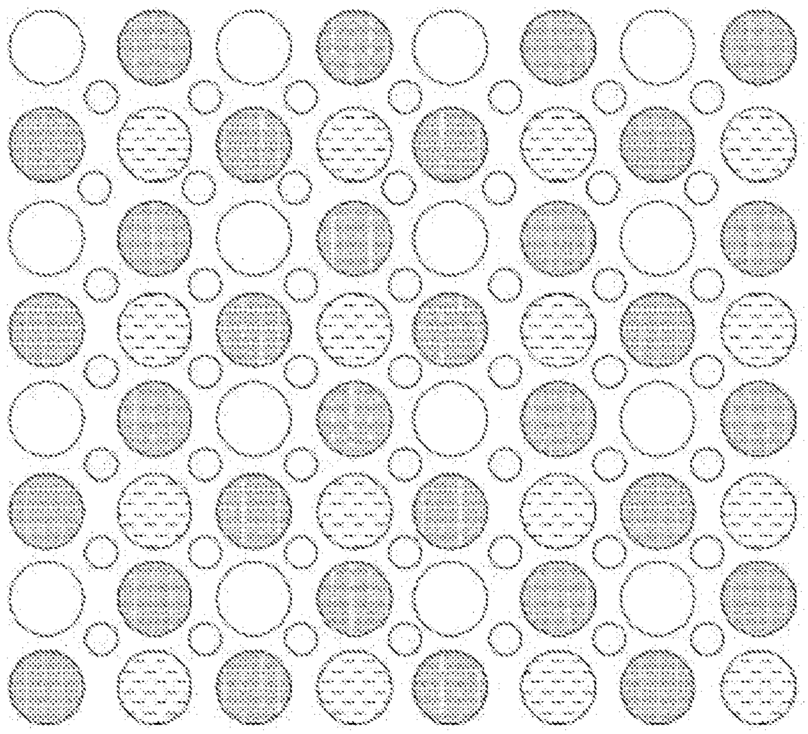

In the present embodiment, different types of pixel data structures can be obtained during the aforementioned distinct display stages, and the pixel data structures in different display stages are displayed in respectively corresponding pixel arrays consisting of varying numbers of rows and columns. Consequently, each subframe display image can be composed of four sub-fields, and each sub-field has a different pixel data structure. As depicted in FIG. 9, due to the very short time intervals between the first stage, second stage, third stage, fourth stage, and among the subframes, which are only on the order of microseconds, when observed by the human eye, under the visual residual effect of the human eye, an ultimate display effect is achieved, providing a fourfold display effect under the same number of real pixels.

Furthermore, in the embodiments of the present application, under an N*M pixel array structure, the pixel points displayed by both the virtual pixels and real pixels are (2m−1)*(2n−1). This means that when N and M are sufficiently large, the pixel points are approximately equal to 2N*2M, which is 4NM, four times the number of real pixels. In this present embodiment, by controlling the grayscale values of different sub-pixels, various display effects are achieved, resulting in a fourfold display effect under the same number of pixels.

Figure 10:
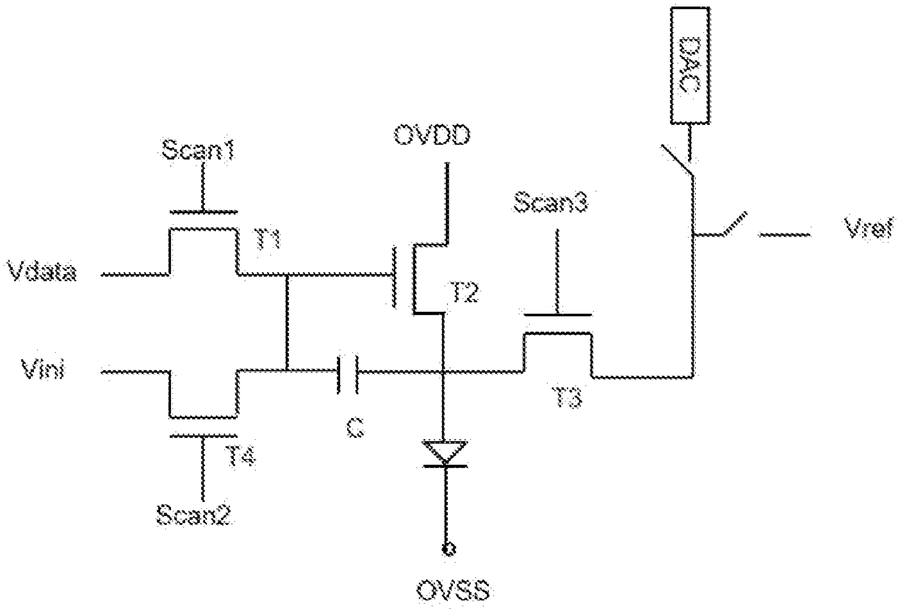
FIG. 10 shows a pixel driving circuit according to one embodiment of the present application.

As shown in FIG. 10, FIG. 10 illustrates a pixel driving circuit according to one embodiment of the present application. Specifically, this driving circuit is a 4TIC driving circuit. When driving this pixel driving circuit, the PWM driving mode is used for driving at low grayscale values. During this mode, different grayscale values are displayed by controlling the charging time for each subframe and the duty cycle, resulting in different pixel data structures. However, at high grayscale values, the PAM driving mode is used for driving, and different grayscale values are displayed by controlling the amplitude of the data signal values corresponding to each subframe, thereby enhancing the display quality of the panel.

Specifically, the pixel driving circuit includes a first thin-film transistor T1, a second thin-film transistor T2, a third thin-film transistor T3, a fourth thin-film transistor T4, a first capacitor C, and a light-emitting diode.

A gate of the first thin-film transistor T1 is electrically connected to a first scan signal line scan1, and a source of the first thin-film transistor T1 is electrically connected to a data voltage line Vdata.

A gate of the second thin-film transistor T2 is electrically connected to a drain of the first thin-film transistor T1, and simultaneously, the gate of the second thin-film transistor T2 is electrically connected to one end of the first capacitor and one end of the light-emitting diode. A drain of the second thin-film transistor T2 is connected to a high potential voltage power supply OVDD.

Simultaneously, a gate of the third thin-film transistor T3 is electrically connected to a third scan signal line scan3, and a drain of the third thin-film transistor T3 is connected to a reference voltage source Vref and a DAC. A source of the third thin-film transistor T3 is electrically connected to the first capacitor, one end of the light-emitting diode, and a source of the second thin-film transistor T2.

A gate of the fourth thin-film transistor T4 is electrically connected to a second scan signal line scan2. A source of the fourth thin-film transistor T4 is electrically connected to the drain of the first thin-film transistor T1, one end of the first capacitor C, and the gate of the second thin-film transistor T2. A drain of the fourth thin-film transistor T4 is electrically connected to an initial voltage Vini.

Simultaneously, the other end of the light-emitting diode is connected to a low potential voltage power supply. This forms the pixel driving circuit provided in the present embodiment.

Figure 11:
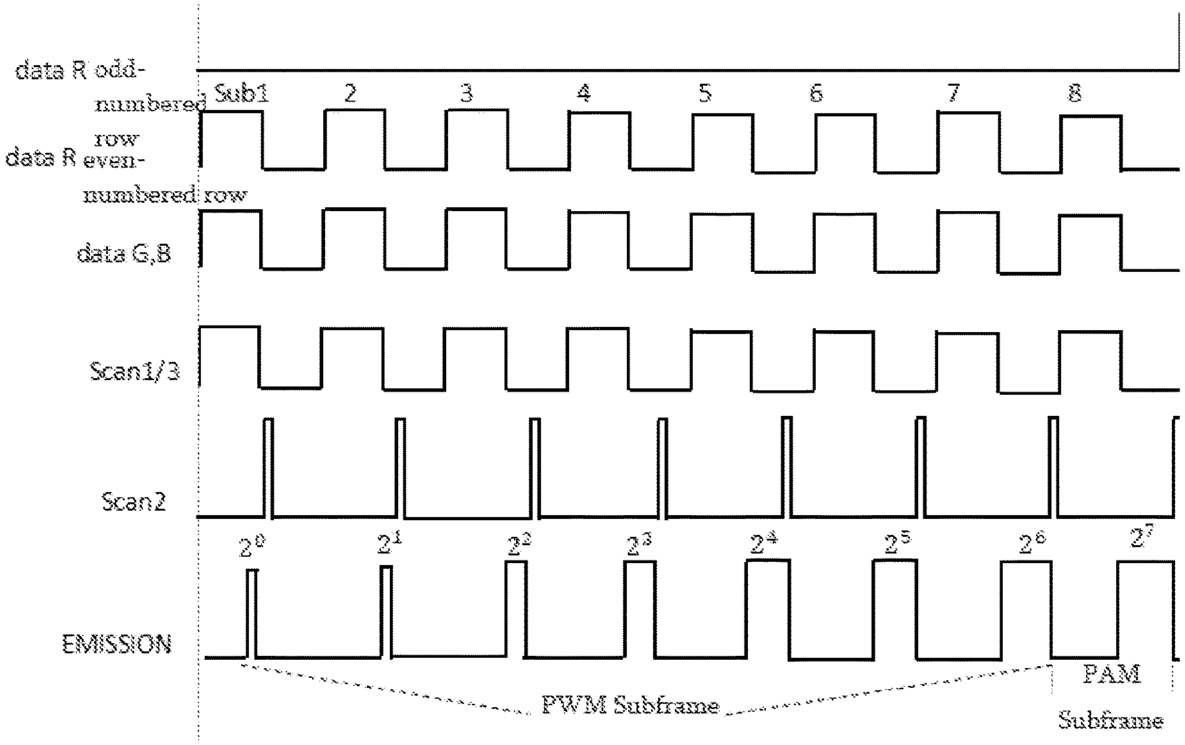
FIG. 11 is a timing diagram of the pixel driving circuit according to one embodiment of the present application.

As shown in FIG. 11, FIG. 11 is a timing diagram of the pixel driving circuit provided in the present embodiment. Combining the pixel driving circuit described above with the corresponding timing diagram, during driving, different control signals are provided to the red sub-pixels in the odd-numbered and even-numbered rows of the pixel units. During low grayscale values, when scan 1/scan3 is at a high level, the first thin-film transistor T1 and the third thin-film transistor T3 are turned on. At this time, the Vdata voltage is applied to the gate of the second thin-film transistor T2, controlling the opening of the second thin-film transistor T2. Subsequently, when scan 1/scan3 is at a low level, the first thin-film transistor T1 and the third thin-film transistor T3 are turned off, and a level of the second thin-film transistor T2 is maintained by the first capacitor C.

Specifically, if a high grayscale image is required, pulse amplitude modulation (PAM) is used. In this case, the control signal for the fourth thin-film transistor T4 is set to a low level, turning off the fourth thin-film transistor T4. The width of the data voltage is as the 8th subframe, where the data voltage is set to 0 for the preceding 7 subframes. The amplitude of the data voltage is adjusted to display different high grayscale values. If a low grayscale image is needed, pulse width modulation (PWM) is used. The amplitude of the data voltage is as the preceding 7 subframes, and the data is set to 0 for the 8th subframe. The control signal for the fourth thin-film transistor T4 is set to a high level, turning on the fourth thin-film transistor T4. Depending on the desired low grayscale values, the data voltage for the preceding 7 subframes is controlled. For example, the values of the data voltage are set to 0. The duration of the light-emitting diode's charging time is controlled for different low grayscale displays.

In the driving process, the charging time varies according to the different grayscale requirements of each sub-pixel. When the required charging time is reached, the second scan signal line scan2 is a high-level signal, controlling the opening of the fourth thin-film transistor T4, thereby achieving discharge and ending the charging process. In this embodiment, the first thin-film transistor T1, the second thin-film transistor T2, and the third thin-film transistor T3 primarily control the PAM driving mode, while the fourth thin-film transistor T4 mainly controls the PWM driving mode.

As shown in FIG. 11, during the 1st subframe to the 7th subframe, through the above control, the light-emitting diode has different pulse widths in different subframes, such as pulse widths of $2^0$, $2^1$, $2^2$, $2^3$, $2^4$, $2^5$, $2^6$. In the 8th subframe, the pulse width of the light-emitting diode is $2^7$, thereby achieving different display effects.

Figure 12:
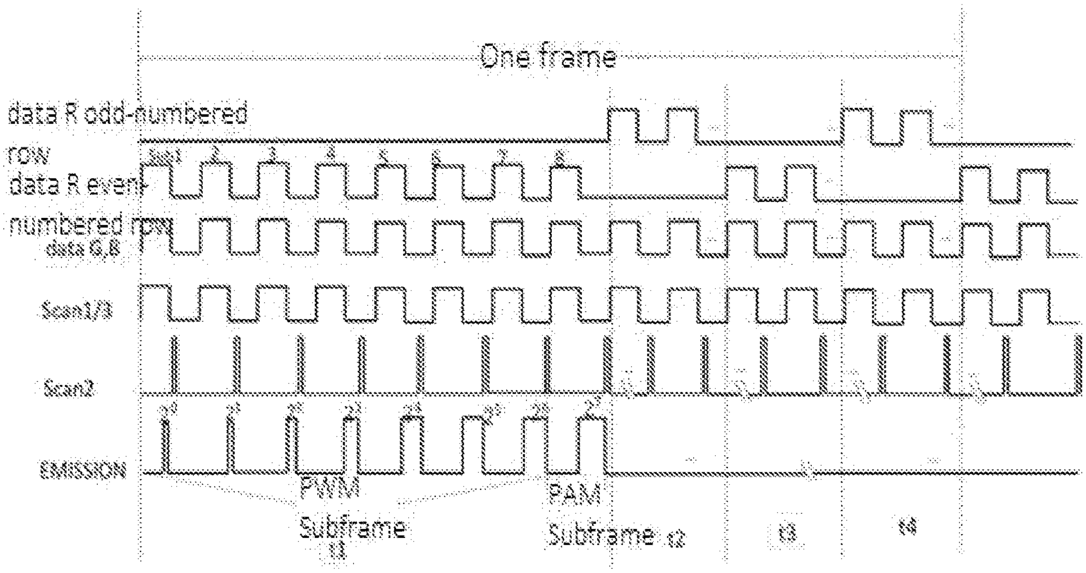
FIG. 12 is another timing diagram of the pixel driving circuit according to one embodiment of the present application.

As shown in FIG. 12, FIG. 12 is another timing diagram of the pixel driving circuit according to one embodiment of the present embodiment. In conjunction with the timing diagram in FIG. 11, in the present embodiment, a frame of display content is divided into four display stages, and these four stages, t1 to t4, correspond to four different pixel data structures. These pixel structures are the first pixel data structure 61, the second pixel data structure 62, the third pixel data structure 64, and the fourth pixel data structure 63 provided in the embodiment of the present application. In this way, 8 subframes are repeated in each stage, resulting in 32 subframes. However, within these 32 subframes, the content of every 8 subframes is identical, thus achieving the desired display effect.

Simultaneously, in the present embodiment, within each display stage, the preceding (N−1) subframes, such as the 1st subframe to the 7th subframe, have the same amplitude but different widths (duty cycles), with each width corresponding to a grayscale value. In the N-th subframe, such as the 8th subframe, the pulse width of the light-emitting diode corresponds to the Nth width. By adjusting the amplitude values, different high grayscale levels are displayed, achieving different display effects.

If the hybrid driving method of the present application is employed, at a frequency of 60 Hz, the blue sub-pixels and the green sub-pixels can achieve a maximum refresh frequency of 1920 Hz, while the red sub-pixels can achieve a maximum refresh frequency of 960 Hz.

In the present embodiment, by utilizing different driving methods and combining real pixels with virtual pixels, a fourfold pixel display performance is achieved on a transparent glass substrate. This approach allows for a reduction in the number of light-emitting diode chips and driving circuits, resulting in cost savings, reduced manufacturing complexity, and improved transparency. Additionally, in the present application, the distribution of emission points for the created virtual pixels is uniform, effectively enhancing the display performance of the panel.

Furthermore, in the embodiments of this application, a display panel and a display device are provided. In the configuration, the display panel and the display device include a substrate, pixel units arranged in an array on the substrate, and pixel driving circuits electrically connected to the pixel units. The arrangement and the driving method of the pixel units are carried out in accordance with the embodiments of this application. The substrate is configured as a transparent glass substrate, thereby effectively enhancing the display performance and overall performance of the panel.

The display panel and the display device can be applied to any device with high refresh rate, including but not limited to computers, e-readers, monitors, laptops, digital photo frames, and the like.

In summary, a driving method for a display panel, a pixel driving circuit, and a display panel provided by the embodiments of the present invention have been introduced in detail as above. The present disclosure uses specific examples to illustrate the principles and implementations of the present invention. The description of the above embodiments is only used to help understand the technical solutions and main ideas of the present invention. Although the present invention is disclosed above in preferable embodiments, the above preferable embodiments are not intended to limit the present invention. Those of ordinary skill in the art can make changes and modifications without departing from the spirit and scope of the present invention. Therefore, the protection scope of the present invention is based on the scope defined by the appended claims.

What is claimed is:

1. A driving method for a display panel, comprising following steps:

obtaining a frame of an image to be displayed;

in each frame of the image to be displayed, dividing the image to be displayed into multiple consecutive display stages, each of the display stages comprising N subframes, wherein N is an integer greater than or equal to 1;

in each of the display stages, providing a first control signal to pixel units in the 1st subframe to the (N−1)-th subframe among the N subframes through pixel driving circuits of the display panel; and providing a second control signal to the pixel units in the N-th subframe among the N subframes and obtaining different pixel data structures in the respective display stages for display, wherein the pixel data structures in the display stages are displayed by respectively corresponding pixel arrays consisting of different numbers of rows and columns, wherein among the N subframes, the pixel units display low grayscale values in the 1st subframe to the (N−1)-th subframe, and the pixel units display high grayscale values in the N-th subframe;

wherein the first control signal is a pulse width modulation (PWM) signal, and the second control signal is a pulse amplitude modulation (PAM) signal.

2. The driving method according to claim 1, wherein the pixel units are arranged in an array within a display area of the display panel and form an N*M pixel array, and each of the pixel units comprises a first color sub-pixel, a second color sub-pixel, and a third color sub-pixel;

wherein, in each of the pixel units, one of the sub-pixels among the first color sub-pixel, the second color sub-pixel, or the third color sub-pixel is duplicated twice.

3. The driving method according to claim 2, wherein in the pixel array, during the process of controlling the pixel units for each frame through the pixel driving circuits, the sub-pixels duplicated twice in each pixel unit are individually controlled separately in both odd-numbered rows and even-numbered rows.

4. The driving method according to claim 1, wherein the display stages comprise a first stage, a second stage, a third stage, and a fourth stage consecutively set, each stage consisting of 8 subframes, and during driving, the 1st to 7th subframes are pulse width modulated (PWM), and the 8th subframe is pulse amplitude modulated (PAM).

5. The driving method according to claim 4, wherein the display stages comprise:

in the first stage, controlling the pixel driving circuit to set data signal values of the first color sub-pixels in odd-numbered rows within the pixel array to zero, wherein the first control signal is provided in the 1st subframe to the 7th subframe, while the second control signal is provided in the 8th subframe, resulting in a first pixel data structure;

in the second stage, controlling the pixel driving circuit to set data signal values of the first color sub-pixels in even-numbered rows within the pixel array to zero, with data signal values of the sub-pixels in a first column and a last column set to zero, wherein the first control signal is provided in the 1st subframe to the 7th subframe, and the second control signal is provided in the 8th subframe, resulting in a second pixel data structure;

in the third stage, controlling the pixel driving circuit to set the data signal values of the first color sub-pixels in the odd-numbered rows within the pixel array to zero, along with setting data signal values of the sub-pixels in a first row and a last row to zero, wherein the first control signal is provided in the 1st subframe to the 7th subframe, and the second control signal is provided in the 8th subframe, resulting in a third pixel data structure; and in the fourth stage, controlling the pixel driving circuit to set the data signal values of the first color sub-pixels in the even-numbered rows to zero, as well as setting data signal values of the sub-pixels in the first row, the last row, the first column, and the last column to zero, wherein the first control signal is provided in the 1st subframe to the 7th subframe, and the second control signal is provided in the 8th subframe, resulting in the fourth pixel data structure.

6. The driving method according to claim 5, wherein in different pixel data structures, each pixel unit comprises a virtual pixel, and the virtual pixel is located at a center of the pixel unit.

7. A driving method for a display panel, comprising following steps:

obtaining a frame of an image to be displayed;

in each frame of the image to be displayed, dividing the image to be displayed into multiple consecutive display stages, each of the display stages comprising N subframes, wherein N is an integer greater than or equal to 1;

in each of the display stages, providing a first control signal to pixel units in the 1st subframe to the (N−1)-th subframe among the N subframes through pixel driving circuits of the display panel; and providing a second control signal to the pixel units in the N-th subframe among the N subframes and obtaining different pixel data structures in the respective display stages for display, wherein among the N subframes, the pixel units display low grayscale values in the 1−st subframe to the (N−1)-th subframe, and the pixel units display high grayscale values in the N-th subframe;

wherein the first control signal is a pulse width modulation (PWM) signal, and the second control signal is a pulse amplitude modulation (PAM) signal.

8. The driving method according to claim 7, wherein the pixel units are arranged in an array within a display area of the display panel and form an N*M pixel array, and each of the pixel units comprises a first color sub-pixel, a second color sub-pixel, and a third color sub-pixel;

wherein, in each of the pixel units, one of the sub-pixels among the first color sub-pixel, the second color sub-pixel, or the third color sub-pixel is duplicated twice.

9. The driving method according to claim 8, wherein in the pixel array, during the process of controlling the pixel units for each frame through the pixel driving circuits, the sub-pixels duplicated twice in each pixel unit are individually controlled separately in both odd-numbered rows and even-numbered rows.

10. The driving method according to claim 7, wherein the display stages comprise a first stage, a second stage, a third stage, and a fourth stage consecutively set, each stage consisting of 8 subframes, and during driving, the 1st to 7th subframes are pulse width modulated (PWM), and the 8-th subframe is pulse amplitude modulated (PAM).

11. The driving method according to claim 10, wherein the display stages comprise:

in the first stage, controlling the pixel driving circuit to set data signal values of the first color sub-pixels in odd-numbered rows within the pixel array to zero, wherein the first control signal is provided for the 1st subframe to the 7th subframe, while the second control signal is provided for the 8th subframe, resulting in a first pixel data structure;

in the second stage, controlling the pixel driving circuit to set data signal values of the first color sub-pixels in even-numbered rows within the pixel array to zero, along with setting data signal values of the sub-pixels in a first column and a last column to zero, wherein the first control signal is provided for the 1st subframe to the 7th subframe, and the second control signal is provided for the 8th subframe, resulting in a second pixel data structure;

in the third stage, controlling the pixel driving circuit to set the data signal values of the first color sub-pixels in the odd-numbered rows within the pixel array to zero, along with setting data signal values of the sub-pixels in a first row and a last row to zero, wherein the first control signal is provided for the 1st subframe to the 7th subframe, and the second control signal is provided for the 8th subframe, resulting in a third pixel data structure; and in the fourth stage, controlling the pixel driving circuit to set the data signal values of the first color sub-pixels in the even-numbered rows to zero, as well as setting data signal values of the sub-pixels in the first row, the last row, the first column, and the last column to zero, wherein the first control signal is provided for the 1st subframe to the 7th subframe, and the second control signal is provided for the 8th subframe, resulting in the fourth pixel data structure.

12. The driving method according to claim 11, wherein in different pixel data structures, each pixel unit comprises a virtual pixel, and the virtual pixel is located at a center of the pixel unit.

13. A pixel driving circuit for use in a driving method for a display panel, the driving method comprising following steps:

obtaining a frame of an image to be displayed;

in each frame of the image to be displayed, dividing the image to be displayed into multiple consecutive display stages, each of the display stages comprising N subframes, wherein N is an integer greater than or equal to 1;

in each of the display stages, providing a first control signal to pixel units in the 1st subframe to the (N−1)-th subframe among the N subframes through pixel driving circuits of the display panel; and providing a second control signal to the pixel units in the N-th subframe among the N subframes and obtaining different pixel data structures in the respective display stages for display, wherein among the N subframes, the pixel units display low grayscale values in the 1-st subframe to the (N−1)-th subframe, and the pixel units display high grayscale values in the N-th subframe;

wherein the first control signal is a pulse width modulation (PWM) signal, and the second control signal is a pulse amplitude modulation (PAM) signal, the pixel driving circuit comprising:

a first thin-film transistor, wherein a gate of the first thin-film transistor is connected to a first scan signal line, and a source of the first thin-film transistor is connected to a data voltage line;

a second thin-film transistor, wherein a gate of the second thin-film transistor is connected to a drain of the first thin-film transistor, a drain of the second thin-film transistor is connected to a high potential voltage power supply, and a source of the second thin-film transistor is connected to a light-emitting diode and one end of a first capacitor;

a third thin-film transistor, wherein a gate of the third thin-film transistor is connected to a third scan signal line, a source of the third thin-film transistor is connected to the source of the second thin-film transistor, and a drain of the third thin-film transistor is connected to a reference voltage; and a fourth thin-film transistor, wherein a gate of the fourth thin-film transistor is connected to the second scan signal line, a source of the fourth thin-film transistor is connected to the drain of the first thin-film transistor and another end of the first capacitor, and a drain of the fourth thin-film transistor is connected to an initial voltage, wherein at the low grayscale values in the 1-st subframe to the (N−1)-th subframe, the first scan signal line and the third scan signal line are set to a high level, turning on the first thin-film transistor and the third thin-film transistor, and the data voltage is supplied to the second thin-film transistor, turning on the second thin-film transistor, and subsequently, the first scan signal line and the third scan signal line transition are set to a low level, turning off the first thin-film transistor and the third thin-film transistor;

at the high grayscale values in the N-th subframe, the second scan signal line is set to a low level, turning off the fourth thin-film transistor, and amplitudes of the data voltage are adjusted, allowing the pixel units to display different grayscale values.

14. The pixel driving circuit according to claim 13, wherein the pulse width modulation signals are provided at the low grayscale values in the 1-st subframe to the (N−1)-th subframe, the pulse amplitude modulation signals are provided at the high grayscale values in the N-th subframe, and under the drive of the pulse width modulation signals, a duty cycle corresponding to a charging time of each subframe is controlled to obtain different grayscale values.

* * * * *